Oct. 14, 1958  R. L. BARBER  2,856,206
FLEXIBLE SEAL-SUPPORTING FLANGE FOR WELLHEAD COUPLINGS
Filed Sept. 22, 1954  2 Sheets-Sheet 1

Robert L. Barber
INVENTOR.

BY
Browning, Simms & Hyer
ATTORNEYS

Oct. 14, 1958 R. L. BARBER 2,856,206
FLEXIBLE SEAL-SUPPORTING FLANGE FOR WELLHEAD COUPLINGS
Filed Sept. 22, 1954 2 Sheets-Sheet 2
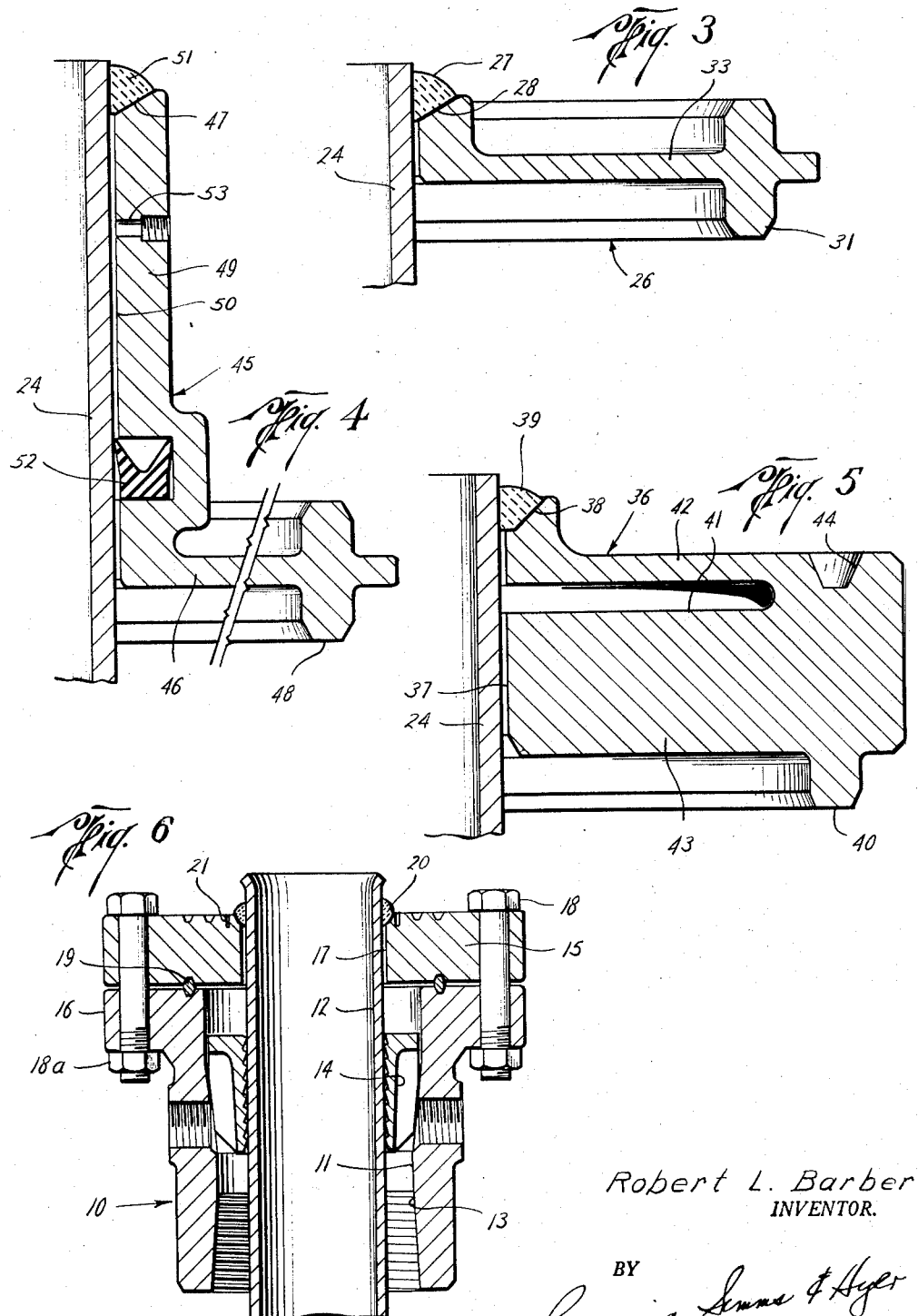
Robert L. Barber
INVENTOR.
BY
ATTORNEYS

United States Patent Office 2,856,206
Patented Oct. 14, 1958

---

2,856,206

FLEXIBLE SEAL-SUPPORTING FLANGE FOR WELLHEAD COUPLINGS

Robert L. Barber, Houston, Tex., assignor to Cameron Iron Works, Inc., Houston, Tex., a corporation of Texas Application September 22, 1954, Serial No. 457,689

1 Claim. (Cl. 285—144)

This invention relates generally to well heads, and more particularly to an improved welding flange for use therewith and a novel method of well head assembly which is made possible by such flange.

It is a conventional practice to provide a seal between a casing head of a well and a well casing suspended therein by placing upon the head an annular flange, tightening the flange against the casing head with suitable sealing means between it and the head to form a seal therebetween, and then welding the flange to the outer surface of the suspended casing to form a seal with the casing.

Since, with the conventional apparatus, the tightening of the flange against the head to form the seal therebetween inevitably results in bodily downward movement of the flange with respect to the previously suspended casing, it is necessary that the flange be so tightened before it is welded to the casing in order that the weld may not be broken by such downward movement. However, the welding cannot be done after a fitting, such as the customary bonnet, is secured above the flange. Hence, it is necessary initially to tighten the flange to the casing head without the bonnet or other fitting in place thereon, weld the flange to the casing, remove the initial tightening means, put the bonnet or the like in place, and then tighten the bonnet and flange together to the head.

To be more specific, it has been the practice to provide the welding flange, as well as flanged portions on the top of the casing head and the aforementioned fitting, with matched bolt holes whereby the welding flange could first be bolted down to the casing head to establish the seal without the fitting in place, the weld made, the bolts removed, and the fitting then properly disposed over and bolted down to the flange and casing head. It will be appreciated that this is an awkward and time-consuming procedure.

It is an object of this invention to provide a novel welding flange which makes possible a considerably less complicated procedure and yet does not involve any danger of breaking the weld.

Another object is to provide a welding flange which makes possible a novel method of well head assembly in which it is unnecessary to pre-tighten the flange to determine its final sealed position relative to the casing head prior to welding said flange to the casing.

Still another object is to provide such a welding flange which permits both the flange and fitting to be properly seated by means of only a single bolting operation during the aforementioned assembly procedure.

Other and further objects of this invention will appear as the description proceeds.

In the accompanying drawings forming a part of the instant specification and wherein like reference numerals are used in the various views to indicate like parts:

Fig. 3 is a partial enlarged sectional view of the welding flange as it is shown in Fig. 1;

Fig. 4 is a view similar to Fig. 3 of another embodiment of the welding flange of the present invention welded to the casing;

Fig. 5 is a view similar to Figs. 3 and 4 of still another embodiment of such welding flange; and Fig. 6 is a vertical sectional view of a well head employing a conventional welding flange and illustrating the prior art method of assembly thereof.

Figure 1:
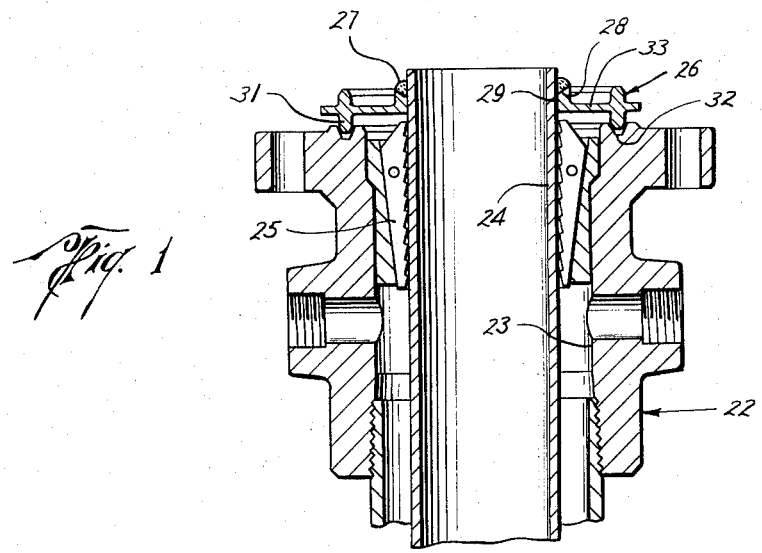
Fig. 1 is a vertical sectional view of a well head without an upper fitting in place and with one embodiment of the welding flange of the present invention welded to the casing, but prior to its having been sealed to the casing head.

Briefly stated, the novel welding flange of the present invention is, according to the aforementioned conventional practice, disposable on the casing head and provided with an opening therethrough for suspending the casing. As well, the flange is weldable to the casing along one portion or surface adjacent the opening and sealable along another portion or surface to the casing head so as to provide a seal between the casing and casing head.

However, intermediate the aforesaid portions or surfaces the flange is provided with a relatively thin strip or web portion which is flexible to permit substantial relative movement of its sealing portion or surface axially of the flange opening or welding surface thereof. This flexibility enables a radically new and improved method of assembly whereby the flange may be first welded to the casing and then moved axially with respect to the opening therethrough and toward the casing head to effect sealing of the joint therebetween.

During such movement, the flange is flexed between its welded connection with the casing and its seal connection with the casing head without danger of breaking the weld. With this construction, it is unnecessary to first bolt the flange down to the casing head without the fitting in place to determine its final sealed position before welding the flange to the casing. To the contrary, this intermediate pre-positioning of the flange and the added bolting step necessitated thereby are eliminated and the assembly procedure thus greatly simplified and shortened in length of time.

Referring first to Fig. 6 of the drawings for a better understanding of prior art practices, there is shown part of a well head comprising a casing head 10 having an opening 11 therethrough which receives an inner well casing 12. The lower end of opening 11 is threaded at 13 to receive a surface string of casing while the upper end thereof is bowl-shaped to hold slips 14 wedged against the casing 12 and fixedly holding the same with respect to the casing head.

A welding flange 15 is disposed on the top flanged portion 16 of the casing head and is provided with a central opening 17 through which the casing extends. Matched openings in the flange and portion 16 receive bolts 18 which, upon tightening of the nuts 18a, move the flange downwardly with respect to the casing head to the position shown in Fig. 6 wherein the annular seal ring 19 is initially sealably compressed between matching annular grooves in the flange and casing head. At this time, the flange may be welded to the casing as at 20, thereby completing the seal between the casing and casing head. The bolts 18 must then be removed, an upper fitting (not shown) disposed over the casing and casing head, and the bolts 18 replaced with longer bolts or studs for securing the fitting above the flange to complete the assembly.

As previously mentioned, and as will now be more apparent, this intermediate step is necessary according to present practices to avoid any danger of breaking the weld. That is, the sealing ring is compressible into its groove in the casing head by movement downwardly of the flange relative to the casing. In the case of conventional stiff welding flanges, such as flange 15, if the sealing ring is not first compressed into its groove prior to welding, the movement downwardly of the flange to effect such compression after welding may break the weld since the casing is fixed by the slips 25 with respect to the casing head.

As described in the Patent Number 2,313,308 to Allen and as shown in Fig. 6, the flange 15 has been provided with an annular slit 21 closely adjacent the opening 17 such that the portion of the flange therebetween will be relatively thin and flexible. The purpose of this portion, however, is to compensate for radial expansion and contraction of the casing upon heating due to the weld, and, therefore, it is made similarly flexible radially of the opening 17 and casing 12 received therethrough. It will be understood that such portion is not flexible in a direction longitudinally of the casing and would permit neither the flexure provided by this invention nor the advantages thereof.

Figure 2:
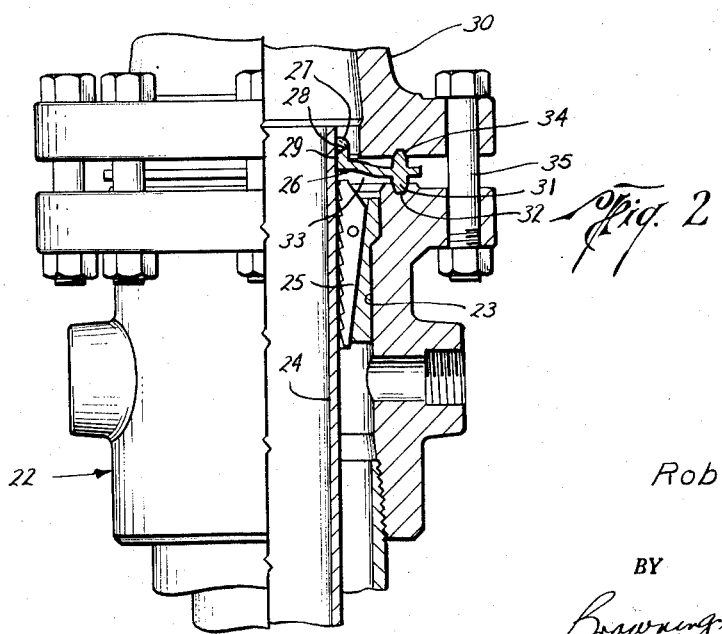
Fig. 2 is a view similar to Fig. 1, but illustrating a subsequent step in assembly in which an upper fitting has been bolted down to the casing head and the welding flange sealed to the casing head and the fitting.

Turning now to the novel welding flange and method of assembly of the present invention, there is shown in Figs. 1 and 2 a well head substantially similar to that shown in Fig. 6 and comprising a casing head 22, having an opening 23 therethough, a casing 24 extending through such opening, and slips 25 wedged into gripping relation with the casing. One embodiment of the novel welding flange, designated in its entirety by the numeral 26, is shown in Fig. 1 welded as at 27 to the casing along a beveled surface 28 adjacent an opening 29 through which said casing extends. In this Fig. 1 position, it can be seen that the fitting 30 (Fig. 2) is not yet in place and that a sealing ring 31 which is shown integral with the flange is disposed within an annular groove 32 in the casing head but not pressed tightly into the groove and hence in non-sealed relation therewith. For this reason, a space is shown beneath the ring and above the bottom of the groove, into which space said ring is later to be compressed upon movement of the flange downwardly.

Referring to the enlarged detailed view of Fig. 3, it is more clearly shown that the ring 31 is formed integrally with the flange and thus forms the surface or portion arranged concentrically of welding surface 28, which surface is sealably connected to the casing head 22. Disposed between and connecting the sealing surface 31 and the welding surface 28 is a strip or web 33 of a thickness to allow substantial flexure under load. It will be understood that although in the particular embodiment shown, the ring is formed integrally with the welding flange, and this arrangement is preferred due to the thinness of the strip 33, instead the flange could be thickened and provided with an annular groove which would provide a sealing surface in combination with a separable ring, as will be described in connection with the embodiment of Fig. 5.

As shown in Fig. 2, after the welding operation, the fitting 30 may be placed on and forced down upon the flange 26 and casing head 22 such that the ring 31 is compressed and sealed with respect to groove 32 in the casing head as well as a matching groove 34 in the fitting 30. A permanent securement is obtained by bolts 35 received through matched openings in the fitting and casing head. During this bolting down of the fitting and consequent movement of the radially outer portion of the gasket 31 axially downward with respect to the casing head to establish the seal between the flange and casing head, the strip or web portion 33 is flexed to the position shown in Fig. 2, this flexing being shown in exaggerated proportion for purposes of illustration.

Two additional embodiments of the welding flange, shown in Figs. 4 and 5, are adapted to be assembled within the well head in the same manner and are productive of similar improved results. Referring to the Fig. 5 showing, there is shown a welding flange 36 having an opening 37 therethrough which receives the casing 24, a beveled surface 38 adjacent the opening for welding at 39 to said casing, and a sealing surface 40 in the form of an integral seal ring arranged concentrically of the welding surface. In this embodiment, however, the flange is thicker and has formed annularly of the opening 37 a radially extending recess 41 which defines a flexible web or strip 42 above the recess and a considerably thicker and substantially rigid base portion 43 below the recess, both of which are disposed intermediate the weldable and sealable surfaces 38 and 40, respectively. As can be seen from Fig. 5, the increased thickness of the flange permits the provision of an annular groove 44 in the upper side thereof for sealing with an upper fitting by means of a conventional separable seal ring element.

The welding flange 45 of Fig. 4 is not only provided with a flexible web or strip 46 intermediate the weldable surface 47 and sealing surface 48, but also an elongate tubular portion 49 which defines the opening 50 through the flange for receiving the casing 24, and permits the incorporation with the flange of means for testing the weld 51 between the casing 24 and the surface 47 for leakage.

As shown in Fig. 4, the opening 50 of the flange is slightly spaced from the casing 24 to provide a fluid receiving space therebetween. According to conventional practice, a suitable seal, in this case an expandable V-shaped packing 52, is provided in the flange adjacent the opening for sealing between the casing and flange. Disposed between this seal and the weld 51 is an opening 53 communicating the outside of the flange with the aforementioned space to provide a means through which fluid may be introduced into the space under pressure. The seal 52 is expandable to sealing position upon the introduction of pressure into the fluid space such that if it is found that the pressure does not drop, it may be assumed that the weld 51 is fluid tight.

From the foregoing, it will be apparent that means have been provided whereby the objects and advantages of this invention may be realized. Specifically, means have been provided which eliminate the necessity of the initial clamping or securing of a welding flange to a casing head before welding the flange to the casing. By the elimination of this step, valuable time and labor will be saved and hazards accompanying such time and labor eliminated.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

For use in a well head assembly which includes a casing head below a fitting and a casing received through an opening in said head, slip means between said casing head and casing for fixedly supporting said casing from said casing head, a flange disposable above the casing head and having an opening for receiving the casing therethrough, a surface on the flange adjacent the opening therethrough for welding to the casing to seal with the same, deformable seal means on the outer portion of said flange for sealing between the casing head and fitting, and a relatively thin strip intermediate said welding surface and sealing means which is flexible upon relative movement between said flange outer portion and said head in a direction axially toward each other.

(References on following page)

References Cited in the file of this patent

UNITED STATES PATENTS

| | | |
|---|---|---|
| 963,688 | Cosgrove | July 5, 1910 |
| 1,834,444 | Bock | Dec. 1, 1931 |
| 1,908,120 | Cox et al. | May 9, 1933 |
| 2,144,227 | Penick et al. | Jan. 17, 1939 |
| 2,209,325 | Dennis | July 30, 1940 |
| 2,230,589 | Driscoll | Feb. 4, 1941 |
| 2,312,476 | Penick | Mar. 2, 1943 |
| 2,313,308 | Allen | Mar. 9, 1943 |
| 2,350,867 | Bean et al. | June 6, 1944 |